United States Patent

Miyaoh et al.

[11] Patent Number: 5,895,054
[45] Date of Patent: Apr. 20, 1999

[54] METAL GASKET WITH A THICK SEAL RING AROUND A BORE

[75] Inventors: Yoshio Miyaoh, Tokyo; Susumu Inamura, Utsunomiya, both of Japan

[73] Assignee: Ishikawa Gasket Co., Ltd., Tokyo, Japan

[21] Appl. No.: 08/890,795

[22] Filed: Jul. 11, 1997

[30] Foreign Application Priority Data

Jul. 19, 1996 [JP] Japan ................................. 8-191107
Jul. 19, 1996 [JP] Japan ................................. 8-191109

[51] Int. Cl.$^6$ ........................................................ F02F 11/00
[52] U.S. Cl. ........................................... 277/595; 277/598
[58] Field of Search ................................. 277/590, 593, 277/594, 595, 598

[56] References Cited

U.S. PATENT DOCUMENTS

| | | | |
|---|---|---|---|
| 5,542,683 | 8/1996 | Papendorf et al. | 277/594 |
| 5,628,113 | 5/1997 | Tanaka et al. | 277/595 X |
| 5,713,580 | 2/1998 | Ueta | 277/593 |

FOREIGN PATENT DOCUMENTS

| | | |
|---|---|---|
| 0 505 693 | 9/1992 | European Pat. Off. . |
| 0 717 218 | 6/1996 | European Pat. Off. . |
| 1327379 | 8/1963 | France . |
| 2 518 013 | 6/1983 | France . |
| 86 24 068 | 7/1987 | Germany . |
| 94 17 046 | 12/1994 | Germany . |
| 195 20 695 | 7/1996 | Germany . |

*Primary Examiner*—Anthony Knight
*Assistant Examiner*—Greg Binda
*Attorney, Agent, or Firm*—Kanesaka & Takeuchi

[57] ABSTRACT

A metal gasket of the invention is used for an internal combustion engine, especially for an engine with a cylinder liner. The gasket is formed of a first metal plate having a first hole greater than a hole of the engine, an annular ring and a sealing device. The annular ring has an inner size substantially corresponding to the hole of the engine, an outer size substantially corresponding to the first hole, and a thickness greater than that of the first metal plate. The annular ring is situated inside the first hole and attached to the first metal plate. The sealing device provides a surface pressure on the first plate outside the annular ring. Even if there is a gap between the upper end of the cylinder liner and an upper surface of the cylinder block, the annular ring can seal around the hole together with the sealing device.

13 Claims, 3 Drawing Sheets

METAL GASKET WITH A THICK SEAL RING AROUND A BORE

BACKGROUND OF THE INVENTION AND RELATED ART STATEMENT

The present invention relates to a metal gasket with a seal ring for use as a cylinder head gasket of an internal combustion engine.

In an engine with a cylinder liner, the cylinder liner is installed inside a bore of a cylinder block. In this case, an upper end of the cylinder liner is provided with a flange, and the cylinder block has an annular recess, wherein the flange is placed in the annular recess of the cylinder block. It is designed that the upper end of the cylinder liner is flush with the upper surface of the cylinder block, but the upper end of the cylinder liner may be located slightly lower than the upper surface of the cylinder block.

A gasket for the engine with the cylinder liner is disposed under the cylinder head and above the upper surface of the cylinder block and the upper end of the cylinder liner. If the upper end of the cylinder liner is lower than the upper surface of the cylinder block, a small space is formed between the cylinder head and the upper end of the cylinder liner. In this case, conventionally, the gasket has a fire ring around the cylinder bore to securely seal therearound, which makes the gasket inevitably thick.

In case a thick gasket, such as a gasket with a fire ring, is not suitable for an engine, a gasket may be formed of one metal plate, such as Japanese Utility Model Publication No. 61-14748. In this gasket, the metal plate includes a bead and a sealing portion in a ring shape around the cylinder bore. The sealing portion is made thick with a thickness of 0.03–0.05 mm by plating, so that the sealing portion operates as a fire ring.

Since the sealing portion made of plating is expensive and needs extra labor, the above gasket with the sealing portion is not appropriate. Therefore, a thin annular ring has been fixed by welding on a metal plate around a cylinder bore instead of forming the sealing portion by plating. When the gasket with the thin annular ring is installed between the cylinder head and the cylinder block and is tightened, the thin annular ring regulates a compressible height of a bead formed around the thin annular ring, and seals a space in case the upper end of the cylinder liner is located slightly lower than the upper surface of the cylinder block.

However, when the above space is shallow or the surface pressure regulation height for the bead formed therearound is low, the thickness of the annular ring must be thin. In this case, it is difficult to prepare and fix the thin annular ring to the metal plate. Also, the processing cost becomes high.

Further, in case the cylinder block is formed of light metal or alloy thereof in order to provide a light engine, since the rigidity of the cylinder block is lowered especially around the cylinder bore, if a high pressure is formed around the cylinder bore, the cylinder block may deform around the cylinder bore.

In U.S. Pat. No. 4,711,456, rings connected to each other are disposed in the cylinder bores, but the rings are covered by a cover member. Also, in U.S. Pat. No. 4,754,982, a rubber ring is disposed around a fluid hole, not for a cylinder bore. These rings are not easily assembled with a main part of the gasket.

Accordingly, one object of the invention is to provide a metal gasket with a seal ring, wherein the seal ring can be easily assembled with a metal plate.

Another object of the invention is to provide a metal gasket with a seal ring as stated above, which is suitable to be installed in a narrow space or gap, such as between an upper end of a cylinder liner and an upper surface of a cylinder block.

A further object of the invention is to provide a metal gasket with a seal ring as stated above, which can prevent deformation of a cylinder block in case rigidity of the cylinder block is not so strong.

A still further object of the invention is to provide a metal gasket with a seal ring as stated above, which can easily and slightly regulate a surface pressure of a bead.

Further objects and advantages of the invention will be apparent from the following description of the invention.

SUMMARY OF THE INVENTION

A metal gasket of the invention is used for an internal combustion engine. The gasket is basically formed of a first metal plate extending substantially throughout an entire area of a gasket and having a first hole greater than a hole of the engine, and sealing means around the first hole.

An annular ring is prepared to have an inner size substantially corresponding to the hole of the engine, an outer size substantially corresponding to the first hole, and a thickness greater than that of the first metal plate. The annular ring is situated inside the first hole and attached to the first metal plate. The sealing means provides a surface pressure on the first plate outside the annular ring. The sealing means and the annular ring securely seal around the hole of the engine when the gasket is compressed.

In the invention, since the annular ring made of metal is thicker than the first metal plate and is located inside the first hole, the annular ring can provide a surface pressure to seal around the hole and regulate the surface pressure of the sealing means. Also, the annular ring and the first metal plate can be easily assembled together.

The annular ring may have an inner peripheral edge, and an outer peripheral edge having a thickness greater than that of the inner peripheral edge to thereby provide a surface pressure gradually increasing from the inner peripheral edge to the outer peripheral edge when the gasket is compressed. In this case, since a high surface pressure is not formed immediately outside the cylinder bore, the deformation of the cylinder bore is reduced or substantially prevented.

The annular ring has upper and lower surfaces between the inner and outer peripheral edges. Preferably, the upper and lower surfaces are arranged symmetrically relative to a center thereof.

Also, the annular ring may have a plurality of engaging members slidably engaging the first metal plate in the first hole. As a result, a position of the annular ring relative to the first metal plate can be changed based on a condition of the engine to be installed. Also, the annular ring can be easily attached to the first metal plate.

Each of the engaging members has upper and lower edges, and an inwardly curved surface between the upper and lower edges. Namely, the upper and lower edges are pressed so that the first metal plate is held between the upper and lower edges.

The sealing means may be a bead formed on the first plate. In case the gasket is formed of a plurality of metal plates, the bead may be formed on the plate other than the plate with the annular ring.

3

Figure 1:
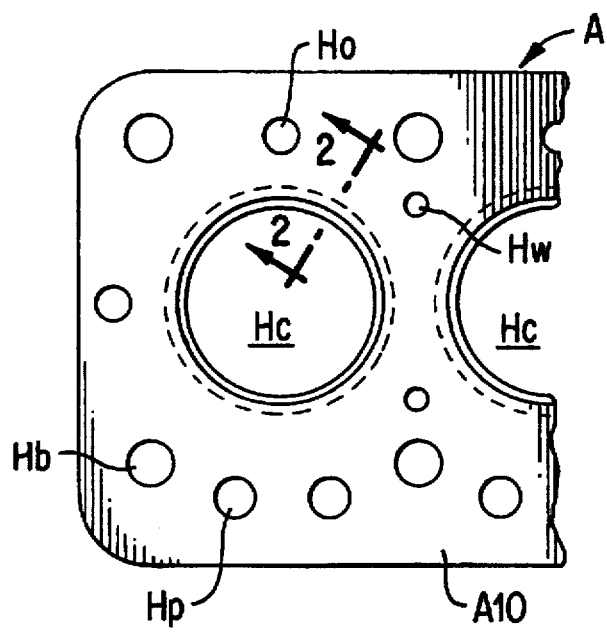
FIG. 1 is a plan view of a part of a first embodiment of a metal gasket of the invention.
Figure 2:
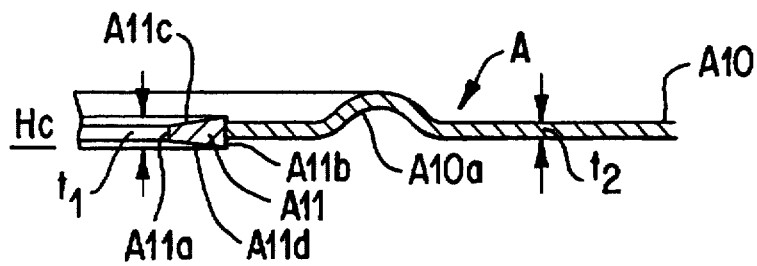
Figure 3:
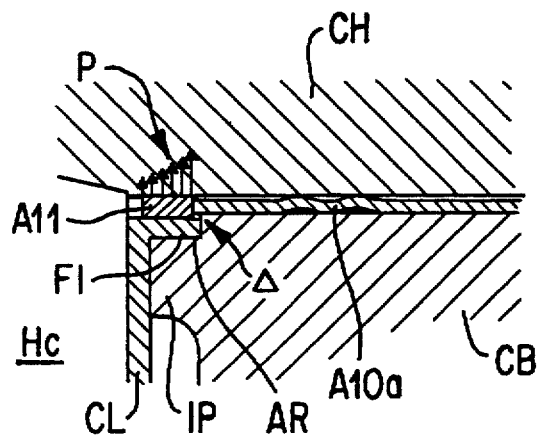
Figure 4:
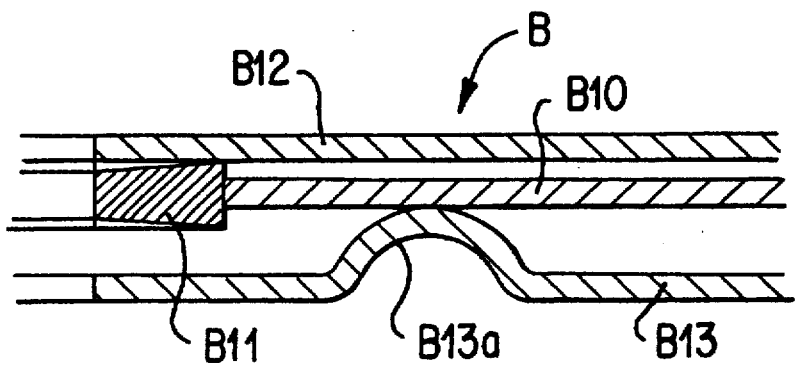
Figure 5:
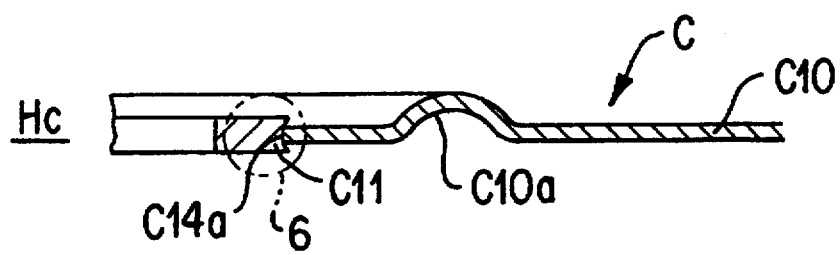
Figures 6A, 6B:
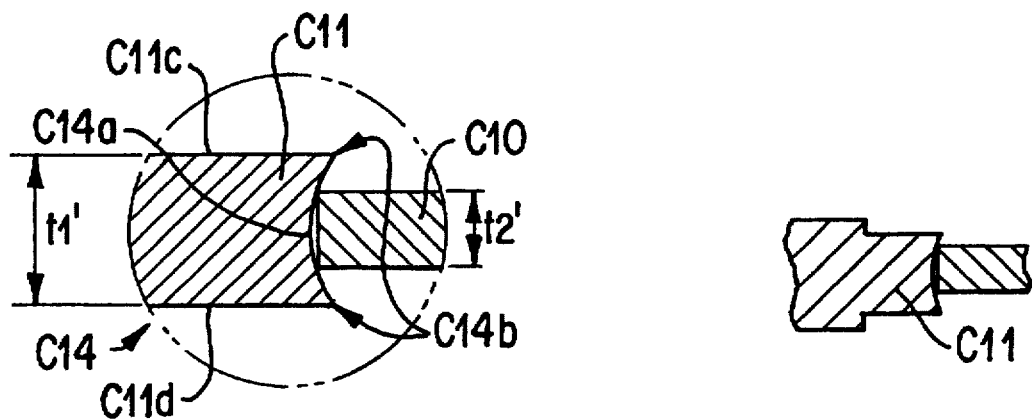
Figure 7:
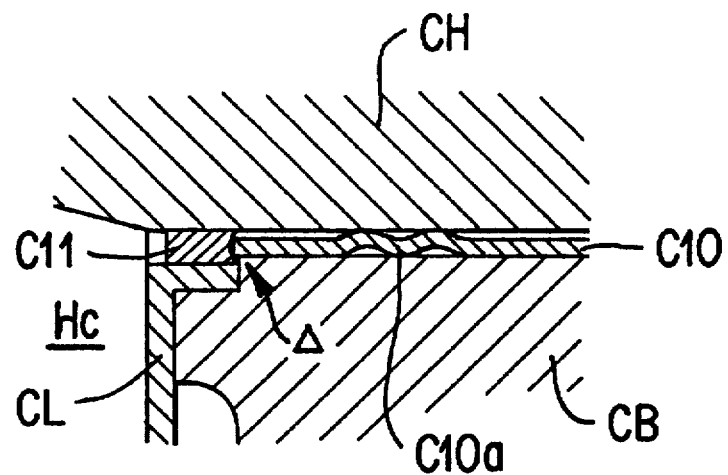
Figure 8:
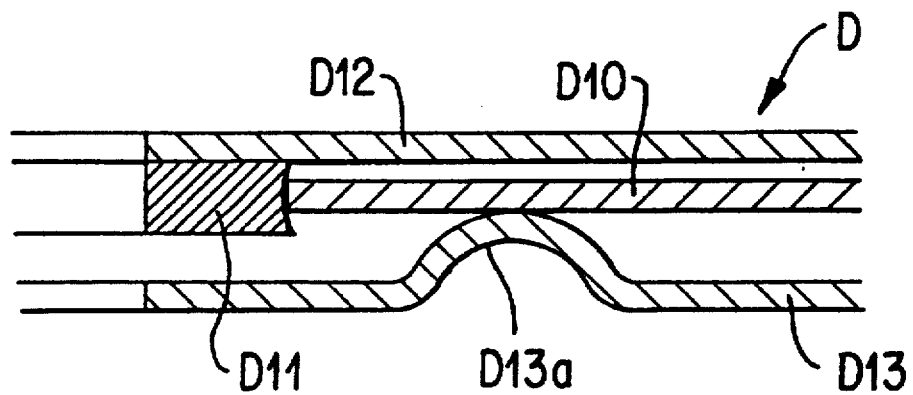

FIG. 2 is an enlarged cross sectional view of the first embodiment taken along line 2—2 in FIG. 1;

FIG. 3 is an explanatory sectional view of the first embodiment of the gasket, wherein the gasket is installed and compressed between a cylinder head and a cylinder block;

FIG. 4 is a sectional view, similar to FIG. 2, of a second embodiment of a metal gasket of the invention;

FIG. 5 is a sectional view, similar to FIG. 2, of a third embodiment of a metal gasket of the invention;

FIG. 6(a) is an enlarged view of a portion 6 in FIG. 5;

FIG. 6(b) is a modification of FIG. 6(a);

FIG. 7 is an explanatory sectional view of the third embodiment of the gasket, wherein the gasket is installed and compressed between a cylinder head and a cylinder block; and FIG. 8 is a sectional view, similar to FIG. 5, of a fourth embodiment of a metal gasket of the invention.

DETAILED DESCRIPTION OF PREFERRED EMBODIMENTS

With reference to FIGS. 1–3, a first embodiment A of a metal gasket of the invention is shown. The gasket A is a cylinder head gasket to be installed in an engine with a cylinder head CH, a cylinder block CB and a cylinder liner CL.

The gasket A includes a plurality of cylinder bores Hc, water holes Hw, oil holes Ho, bolt holes Hb and push rod holes Hp corresponding to those of the engine, as in the conventional gasket. The gasket A is formed of one metal plate A10, and a seal ring A11 situated inside the cylinder bore Hc. The inner size or diameter of the cylinder bore Hc is slightly greater than a cylinder bore of the engine, in which the seal ring A11 is disposed. The inner size of the seal ring A11 substantially corresponds to the cylinder bore of the engine.

A bead A10a is formed on the metal plate A10 around the cylinder bore Hc. When the gasket is installed in the engine, the bead A10a is located on the cylinder block CB outside the cylinder liner CL.

The seal ring A11 has an inner periphery A11a, an outer periphery A11b contacting the plate A10, and upper and lower surfaces A11c, A11d. The thickness or height of the inner periphery A11a is less than that of the outer periphery A11b. The upper and lower surfaces A11c, A11d are arranged symmetrically relative to a central plane thereof, and incline or taper toward the inner periphery A11a from the outer periphery A11b.

The thickness t1 of the inner periphery A11a of the seal ring A11 is greater than the thickness t2 of the metal plate A10 to provide a high surface pressure at the seal ring A11. Preferably, the metal plate A10 is formed of a hard metal, such as SUS301H with a thickness of 0.3–0.6 mm, and the seal ring A11 is formed of a soft steel. The seal ring A11 is fixed to the metal plate A10 by spot welding at several portions. However, the seal ring A11 may be removably attached to the metal plate A10.

The engine to which the gasket A is installed has the cylinder liner CL with a flange FL, while the cylinder block CB has an annular recess AR. When the cylinder liner CL is assembled with the cylinder block CB, the flange FL is located in the annular recess AR of the cylinder block CB. In this condition, the upper end of the cylinder liner CL is ideally flush with the upper surface of the cylinder block CB. However, the upper end of the cylinder liner CL is often located slightly lower than the upper surface of the cylinder block CB to thereby form a gap Δ therebetween.

When the gasket A is installed in the engine, the seal ring A11 is located on the flange FL, and the bead A10a is located on the cylinder block CB. The distance between the lower surface A11d of the seal ring A11 and the lower surface of the metal plate A10 is greater than the gap Δ, so that the seal ring A11 can be interposed between the cylinder head CH and the cylinder liner CL without being affected by the plate A10 to securely seal around the cylinder bore.

As shown in FIG. 3, when the gasket A is installed between the cylinder head CH and the cylinder Block CB and is tightened, the seal ring A11 provides a surface pressure P to seal around the cylinder bore Hc. Since the thickness of the seal ring A11 is increased from the inner periphery to the outer periphery, the surface pressure P gradually changes from the inner periphery to the outer periphery. In this case, since the high surface pressure is not formed immediately outside the cylinder bore, deformation of the cylinder bore is prevented.

When the gasket A is tightened, the bead A10a is also compressed to securely seal around the cylinder bore Hc. Since the seal ring A11 slightly projects upwardly from the upper surface of the metal plate A10, when the gasket A is tightened, the bead A10a is not completely compressed. Namely, the seal ring A11 operates as a surface pressure regulation plate. Therefore, creep relaxation of the bead A10a is prevented.

In the engine as shown in FIG. 3, since the annular recess AR where the flange FL is disposed is formed above an inner projection or flange IP of the cylinder block CB, a large tightening pressure is applied on the inner projection. However, the tightening pressure is applied at a base of the projection, not an inner end close to the cylinder liner CL. Therefore, the deformation of the cylinder block is prevented.

The gasket A can securely seal around the cylinder bore and absorb the gap Δ between the cylinder liner CL and cylinder block CB.

FIG. 4 shows a second embodiment B of a cylinder head gasket of the invention. The gasket B includes a metal plate B10 and a seal ring B11, similar to the gasket A. However, the gasket B further includes an upper plate B12, and a lower plate B13 to sandwich the plate B10 and the seal ring B11 therebetween. Also, a bead B13a surrounding the seal ring B11 is formed in the lower plate B13.

In the gasket B, if there is a gap between the cylinder liner and the cylinder block, though the seal ring B11 is not directly placed on the cylinder liner, the seal ring B11 is located on the gap to securely seal around the cylinder bore. The upper or lower plate may have a curved portion to cover the plates facing the cylinder bore.

FIGS. 5–7 show a third embodiment C of a metal gasket of the invention. The gasket C is formed of a metal plate C10 with a bead C10a, and a seal ring C11, similar to the gasket A. In the gasket C, however, the seal ring C11 is an annular ring with a rectangular cross section having upper and lower surfaces parallel to each other, and includes four engaging portions C14 equally spaced apart from each other. The thickness t1' of the seal ring C11 is greater than the thickness t2' of the metal plate C10.

Each engaging portion C14 is formed by partly pressing the upper and lower surfaces C11c, C11d of the seal ring C11 to have a curved inner surface C14a with upper and lower edges C14b. The outer portions of the upper and lower surfaces of the seal ring C11 may be dented slightly in a rectangular shape to have dented upper and lower surfaces (FIG. 6(b)). The inner surface of the plate C10 contacts the curved inner surface C14a and is held between the upper and lower edges C14b. Therefore, the seal ring C11 can move inside the hole of the metal plate C10, but does not disengage from the metal plate C10.

As shown in FIG. 7, when the gasket C is arranged between the cylinder head CH and the cylinder block CB with the cylinder liner CL, if there is a gap Δ between the upper end of the cylinder liner CL and the upper surface of the cylinder block CB, the seal ring C11 can move relative to the metal plate C10 when the gasket C is compressed. Therefore, the seal ring C11 and the metal plate C10 can be properly held between the cylinder head and the cylinder block without biasing force for connecting the seal ring C11 and the metal plate C10. The seal ring C11 and the bead C10a securely seal around the cylinder bore Hc. In the gasket C, since the bead C10a is not completely flattened by the seal ring C11, creep relaxation of the bead C10a is prevented.

In the gasket A, it is explained that the seal ring A11 is fixed to the metal plate A10 by the spot welding. However, the seal ring A11 may have the engaging portions, as disclosed in the gasket C, to connect the seal ring A11 and the metal plate A10.

FIG. 8 shows a fourth embodiment D of a cylinder head gasket of the invention. The gasket D includes a metal plate D10 and a seal ring D11, similar to the gasket C. However, the gasket D further includes an upper plate D12, and a lower plate D13 to sandwich the plate D10 and the seal ring D11 therebetween. Also, a bead D13a surrounding the seal ring D11 is formed in the lower plate D13.

In the gasket D, if there is a gap between the cylinder liner and the cylinder block, though the seal ring D11 is not directly placed on the cylinder liner, the seal ring D11 can absorb the gap to securely seal around the cylinder bore. The upper or lower plate may have a curved portion to cover the plates facing the cylinder bore.

In the gasket of the invention, since the seal ring which is thicker than the metal plate is arranged inside the cylinder bore of the metal plate, the strong surface pressure is obtained around the cylinder bore. Even if there is a gap between the upper end of the cylinder liner and the upper surface of the cylinder block, the seal ring can compensate the gap to securely seal around the cylinder bore.

While the invention has been explained with reference to the specific embodiments of the invention, the explanation is illustrative and the invention is limited only by the appended claims.

What is claimed is:

1. A metal gasket for an internal combustion engine having at least one hole to be sealed, comprising:
   a first metal plate extending substantially throughout an entire area of a gasket and having a first hole greater in size than at least one hole of the engine,
   an annular ring having an inner size substantially corresponding to at least one hole of the engine, an outer size substantially corresponding to the first hole, and a thickness greater than that of the first metal plate, said annular ring being situated inside the first hole and including a plurality of engaging members slidably engaging the first metal plate in the first hole without disengaging therefrom so that a position of the annular ring relative to the first metal plate is changed based on a condition of the engine to be installed, and
   sealing means for providing a first surface pressure on the first plate outside the annular ring, said sealing means and the annular ring securely sealing around the hole of the engine.

2. A metal gasket according to claim 1, wherein said annular ring has an inner peripheral edge and an outer peripheral edge having a thickness greater than that at the inner peripheral edge to thereby provide a second surface pressure gradually increasing from the inner peripheral edge to the outer peripheral edge when the gasket is compressed.

3. A metal gasket according to claim 2, wherein said annular ring has upper and lower surfaces between the inner and outer peripheral edges, said upper and lower surfaces being arranged symmetrically relative to a center thereof.

4. A metal gasket according to claim 3, wherein said sealing means is a bead formed on the first plate.

5. A metal gasket according to claim 3, further comprising at least one second metal plate situated under the first metal plate, said second metal plate having a second hole having a size substantially corresponding to the inner size of the annular ring, said sealing means being a bead formed on the second metal plate.

6. A metal gasket according to claim 1, wherein each of said engaging members has upper and lower edges, and an inwardly curved surface between the upper and lower edges, said first metal plate being held between the upper and lower edges.

7. A metal gasket according to claim 1, wherein said sealing means is a bead formed on the first plate.

8. A metal gasket according to claim 1, further comprising at least one second metal plate situated under the first metal plate, said second metal plate having a second hole having a size substantially corresponding to the inner size of the annular ring, said sealing means being a bead formed on the second metal plate.

9. A metal gasket for an internal combustion engine having at least one hole to be sealed, comprising:
   a first metal plate extending substantially throughout an entire area of a gasket and having a first hole greater in size than at least one hole of the engine,
   an annular ring having an inner size substantially corresponding to at least one hole of the engine, an outer size substantially corresponding to the first hole, an inner peripheral edge with a thickness greater than that of the first metal plate, and an outer peripheral edge with a thickness greater than that of the inner peripheral edge, said annular ring being situated inside the first hole and engaging the first metal plate to thereby provide a surface pressure gradually increasing from the inner peripheral edge to the outer peripheral edge when the gasket is compressed, and
   sealing means for providing a first surface pressure on the first plate outside the annular ring, said sealing means and the annular ring securely sealing around the hole of the engine.

10. A metal gasket according to claim 9, wherein said annular ring further includes upper and lower linear surfaces extending between the inner and outer peripheral edges.

11. A metal gasket according to claim 10, wherein said upper and lower linear surfaces of the annular ring are arranged symmetrically relative to a center thereof.

12. A metal gasket according to claim 10, wherein said sealing means is a bead formed on the first plate.

13. A metal gasket according to claim 12, further comprising at least one second metal plate situated under the first metal plate, said second metal plate having a second hole having a size substantially corresponding to the inner size of the annular ring, said sealing means being a bead formed on the second metal plate.

* * * * *